United States Patent [19]

DeSantis et al.

[11] 4,399,442

[45] Aug. 16, 1983

[54] ACTIVE TRANSMITTING ANTENNA EMPLOYING AN ELECTRON BEAM BOMBARDED SEMICONDUCTOR

[75] Inventors: Charles M. DeSantis, Neptune; Robert M. True, Ocean, both of N.J.

[73] Assignee: The United States of America as represented by the Secretary of the Army, Washington, D.C.

[21] Appl. No.: 280,562

[22] Filed: Jul. 6, 1981

[51] Int. Cl.[3] .................................... G01S 3/38

[52] U.S. Cl. .................................... 343/100 SA; 343/701; 315/34

[58] Field of Search .................... 343/701, 854, 100 SA; 315/34

[56] References Cited

U.S. PATENT DOCUMENTS 4,310,843 1/1982 Yoder .................................. 343/701

4,353,070 10/1982 Pyee .................................. 343/701

OTHER PUBLICATIONS

Maclean et al., Short Range Active Transmitting Antenna With Very Large Height Reduction, AP Proceedings, Mar. 1975, pp. 286-287.

Electronics World, Low Profile UHF Antenna, Jun. 1966, p. 65.

*Primary Examiner*—Eli Lieberman

*Attorney, Agent, or Firm*—Robert P. Gibson; Jeremiah G. Murray; Michael C. Sachs

[57] ABSTRACT

A high power, broadband, active transmitting antenna for operation in the frequency range below 1 GHz which is in the order of 0.15 wavelength in electrical size. The relatively small antenna is coupled across an electron bombarded semiconductor device in the form of a diode which is penetrated by high energy electrons from an electron gun modulated with the RF signal to be transmitted.

4 Claims, 7 Drawing Figures

ACTIVE TRANSMITTING ANTENNA EMPLOYING AN ELECTRON BEAM BOMBARDED SEMICONDUCTOR

The invention described herein may be manufactured, used and licensed by or for the Government for governmental purposes without the payment to us of any royalties thereon.

BACKGROUND OF THE INVENTION

This invention relates generally to transmitting antennas of electromagnetic radiation and more particularly to active transmitting antennas.

In State of the art VHF antennas in the form of a center-fed dipole, being, for example, six feet in height and having a ten band tuning and matching network in its base, such an antenna has been found to be very efficient; however, if one tries to reduce the size of the antenna to less than 0.1 of its operating wavelength λ, several deleterious effects arise, namely the bandwidth of the antenna decreases, the real or resistive part of the input impedance decreases while the reactive or imaginary part increases drastically, and radiation inefficiency decreases because the tuner losses increase due to the increase of the reactive component of the impedance. Also the complexity of the tuning network increases appreciably. Since the antenna is normally coupled to a transmitter of 50 ohm nominal impedance, a matching network capable of a 10:1 to 20:1 impedance transformation is required over a 2:1 to 3:1 bandwidth. Moreover, if high powers, such as 75 watts or more are used, the tuning and matching networks in these high Q configurations undergo severe voltage stress. If losses are introduced to ease the bandwidth problem such a step results in severely reduced radiation efficiency. In brief, the provision of a low profile broadband antenna of a relatively simple design capable of radiating 75 to 100 watts efficiently has proved to be extremely difficult if not impossible to obtain.

While active antennas are generally known, the use of short active dipoles for receiving purposes has not been followed by corresponding advances for transmitters primarily because reciprocity no longer applies and therefore different configurations are required for both transmitting and receiving applications. One type of active transmitting antenna has been disclosed in an article entitled "Short Range Active Transmitting Antenna With Very Large Height Reduction", by T. S. M. MacLean, et al. which appeared on March, 1975 in the *IEEE Transactions On Antennas And Propagation,* at pages 286 and 287. The configuration disclosed therein comprises a transmitting system having an antenna whose dipole height is of the order of λ/2000 and is of the form called the fed-emitter base loop configuration which includes a transistor coupled between the antenna and the source and ground plane. Another type of active transmitting antenna has been disclosed in an article entitled, "Low Profile UHF Antenna", appearing in *Electronics World* at page 65 on June, 1966. In that configuration, a λ/4 length of wire is formed into a figure "8" configuration which is mounted 2.5 electrical degrees above a ground plane and which is fed from a transistor located beneath the ground plane.

While the known prior art purportedly operates as specified, it has nevertheless been found extremely difficult to both tune and match the antenna of these relatively small heights or sizes over a 2:1 or 3:1 frequency band without RF loss and without electrical and/or mechanical element variation.

Accordingly, it is an object of the present invention to provide an improved high power RF active transmitting antenna which is operable over a relatively wide frequency range.

It is another object of the present invention to provide a high power RF antenna which exhibits a low profile.

And yet another object of the invention is to provide an active transmitting antenna wherein the circuit interface between the antenna and transmitter is substantially minimized or eliminated.

SUMMARY

These and other objects of the invention are accomplished by means of a relatively short antenna element on the order of 0.15λ fed from a hybrid device consisting of a biased semiconductor device such as a diode which is bombarded by high energy electrons from an electron gun modulated with the RF signal to be transmitted.

DESCRIPTION OF THE PREFERRED EMBODIMENTS

Figure 1:
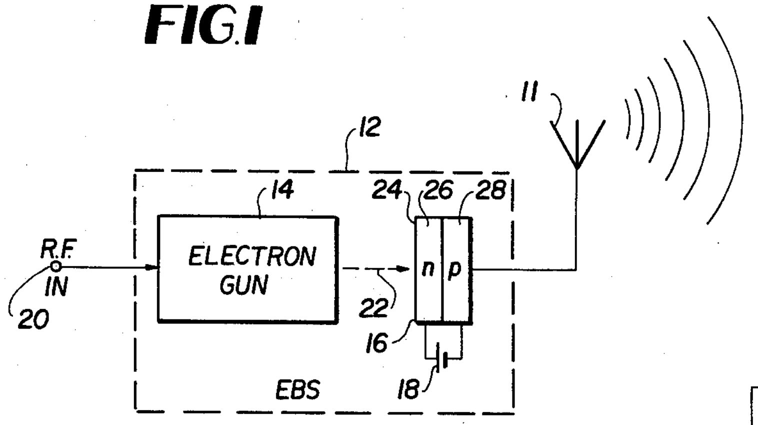
FIG. 1 is a simplified electrical block diagram illustrative of the preferred embodiment of the subject invention.

Referring now to the drawings wherein like reference numerals refer to like components, in FIG. 1 reference numeral 11 denotes a relatively small radiating antenna which has an electrical length less than 0.15 of its operating wavelength λ in the frequency range up to 1 GHz but preferably in the VHF range (30–90 MHz). The antenna 11 is coupled to an electron bombarded semiconductor (EBS) device 12 which comprises a hybrid device consisting of an electron gun 14 having modulation means, not shown, and a biased semiconductor diode 16 including means 18 for applying a reverse bias voltage thereacross. With the application of an RF signal to be transmitted to the electron gun 14 connected, for example, to terminal 20, a modulated stream of high energy electrons penetrates the surface 24 of the diode which includes an n type semiconductor region 26 forming a junction 27 with a p type semiconductor region 28 whereupon electron-hole pairs are released which travel across the junction of the diode 16 under the influence of the reverse bias voltage applied by the source 18 shown for the sake of illustration as a battery. The resulting effect is a current multiplication (gain) of a signal which excites the antenna 11.

Figure 2:
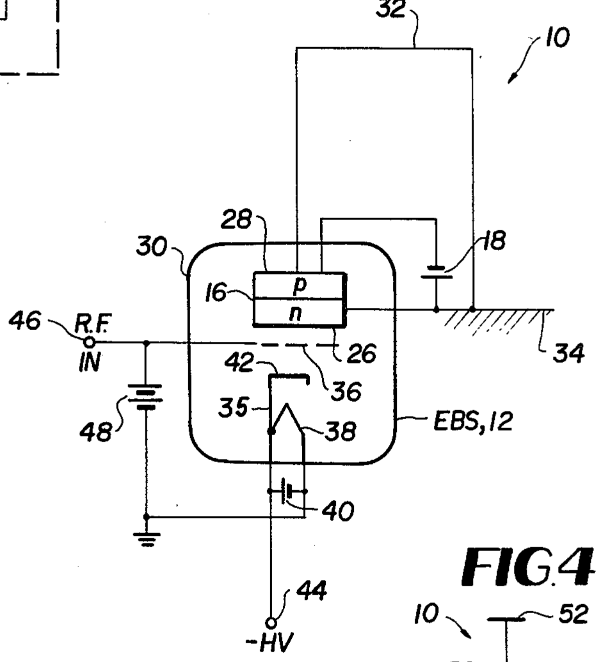
FIG. 2 is an electrical schematic diagram of the preferred embodiment of the subject invention.
Figure 3:
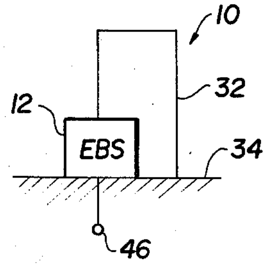
FIGS. 3 through 6 are additional simplified block diagrams of various possible configurations realizable by the subject invention.
Figure 4:
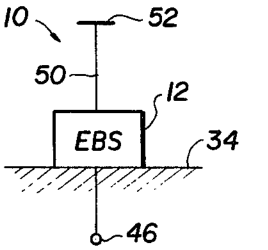
Figure 5:
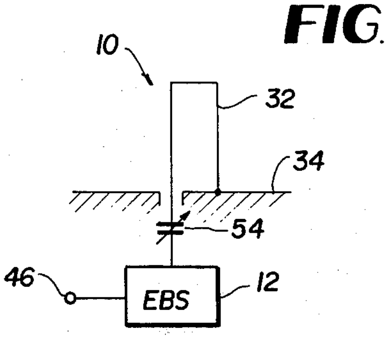
Figure 6:
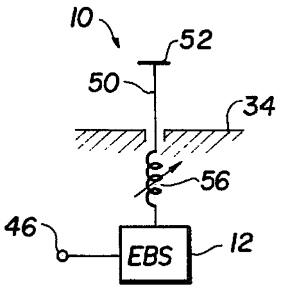

In greater detail, the active antenna system as shown in FIG. 1 is further illustrated in the schematic of FIG. 2, wherein the electron bombarded semiconductor device 12, hereinafter referred to simply as EBS, is contained in a vacuum envelope 30 and the relatively small (0.15λ) antenna 10 comprises a folded monopole radiator element 32 coupled across the diode 16 as well as being terminated in a ground plane 34. The near end of the radiator element 32 is connected to that portion of the diode 16 wherein the electron-hole pair travel takes place. As shown in FIG. 2, the near end of the radiator element 32 is connected to the outer surface of the p layer 28 of the semiconductor diode 16 while the far end is connected to the ground plane 34 which is also connected to the n layer 26. The electron gun 14 of FIG. 1 comprises a heater-cathode assembly 34 and a control grid 36. The assembly 35 includes a heater element 38 and a cathode 42 with the heater requiring a power source 40 coupled thereacross while the cathode 40 has a relatively high negative supply voltage (−HV) coupled thereto via terminal 44. The RF input to the EBS 12 is applied to the grid 36 via input terminal 46 which also has applied thereto a grid bias voltage supplied by means of the DC source 48 which is certain applications may be deleted.

Such a combination as shown in FIG. 2 is adapted to provide output powers from several watts to several hundred watts into an extremely low impedance (1 ohm or less) efficiently due to the fact that the reactive component of the small antenna is properly compensated for so that the antenna in effect sees a very low resistance which is exactly what is required for maximum power output, efficiency and bandwidth. Additionally no impedance transformation is necessary and therefore complicated matching networks are obviated along with the attendant RF loss and voltage breakdown problems formerly encountered in small active antenna configurations. The efficiency of the antenna system will be limited only by conductor losses. More significantly, however, is the fact that the physical size of the antenna will be relatively small, making it an extremely attractive device for military applications, particularly in the VHF range.

Referring now to FIGS. 3 through 6, what these illustrations are intended to show are various ways in which the EBS 12 can be coupled to a relatively short antenna 10. The arrangement shown in FIG. 3 essentially discloses the arrangement of FIG. 2 in that the EBS 12 is coupled to a folded monopole element 32 with the EBS 12 located above the ground plane 34. The configuration shown in FIG. 4 differs from that shown in FIG. 3 only in that the antenna 10 is comprised of a whip type of radiating antenna 50 having a top loading element 52 attached thereto. With respect to the configuration shown in FIG. 5, the EBS 12 is located below the ground plane 34 and being connected to the folded monopole 32 through a variable capacitor 54 which can be utilized for tuning purposes. With respect to the embodiment shown in FIG. 6, the EBS 12 is located below the ground plane 34 and connected to the antenna 10 which comprises a whip type of element 50 and top loading element 52 via a tuning inductance element consisting of a variable inductor 56. In both instances as to the embodiments shown in FIGS. 5 and 6, the variable capacitor 54 and/or the variable inductor 56 can be electronically tuned but since only one variable element is employed for a specific application, tuning of the antenna becomes relatively simple. Additionally, the antenna 10 depending upon what its actual configuration may be in every case has an electrical height which is in the order of 0.15λ or less over the operating frequency range with which it is used and although not shown, the antenna may be capacitively and inductively loaded along its length, depending upon the specific task it is designed to perform.

It should also be pointed out that the semiconductor diode 16 included in the EBS 12 has a characteristic impedance which is complex and is basically capacitive and non-linear with the impedance variation being due to the fact that the capacitance of the p-n junction can be expressed by the equation:

$$C = e_o e_r A / W(v) \quad (1)$$

where C is the voltage dependent capacitance of the junction, $e_o$ is the free space permittivity, $e_r$ is the relative dielectric constant of the semiconductor material forming the diode, A is the junction area and W(v) is the width of the voltage dependent depletion zone.

In a reverse biased semiconductor diode, the zone width W(v) of the depletion region can be expressed as:

$$W(v) = [2 e_o e_r V_r / q N_d]^{\frac{1}{2}} \quad (2)$$

where $V_r$ is the bias voltage applied across the diode, q is the charge of an electron, and $N_d$ is the electron concentration in the N layer of the diode.

In a simple series RLC circuit describing a loop antenna in series with an EBS device, the resonant condition is obtained when $$\omega L_{ANT} = 1/\omega C \quad (3)$$

where $L_{ANT}$ is the inductance of the antenna, C is the capacitance of the EBS device and ω is equal to 2#f, where f is the operating frequency.

Substituting equations (1) and (2) into equation (3), yields the condition of the bias voltage as a function of the frequency necessary to maintain a purely resistive impedance, i.e.:

$$V_r = (e_o e_r q N_d / 2)\,(L_{ANT} A)^2 \omega^4 \quad (4)$$

Figure 7:
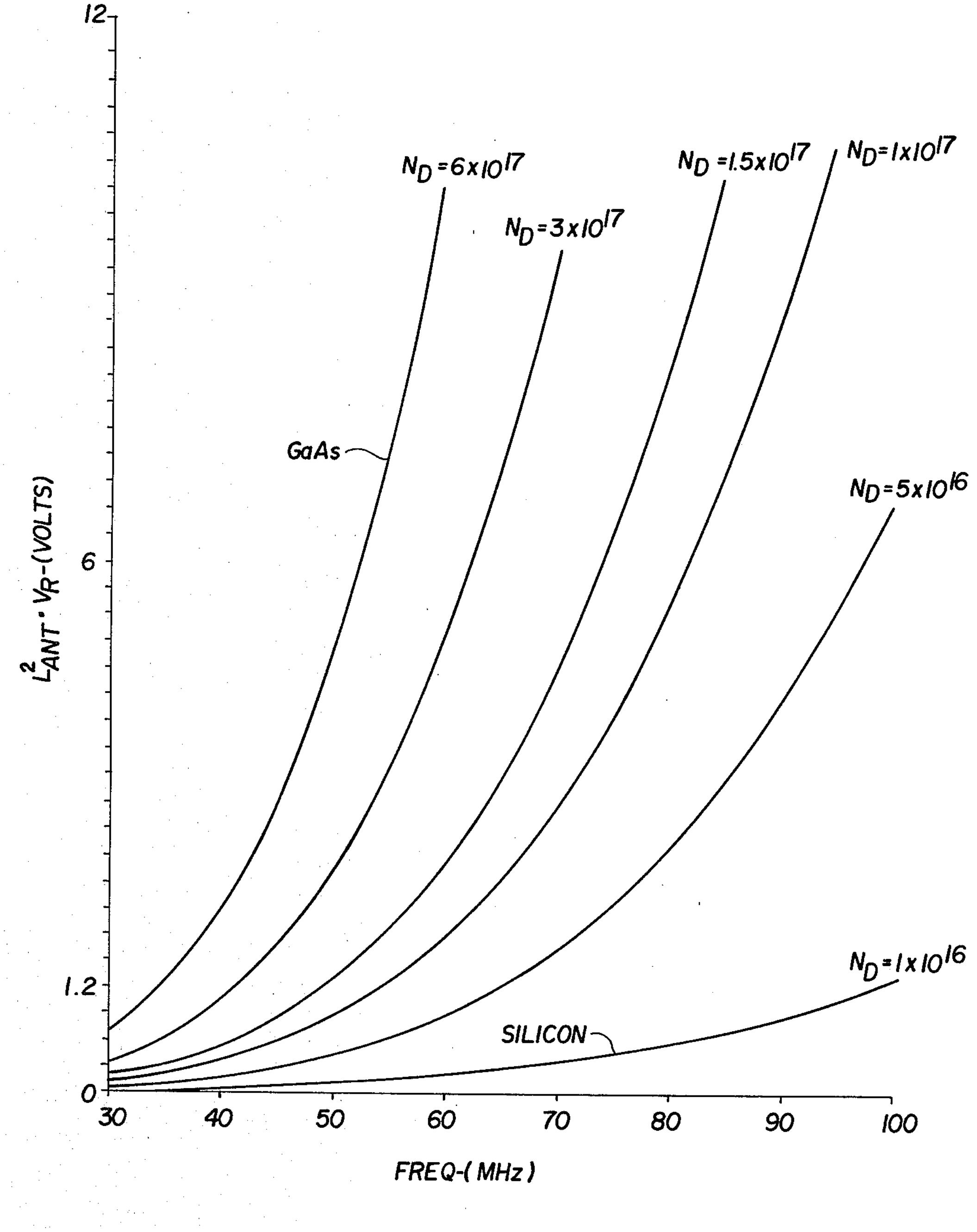
FIG. 7 is a set of characteristic frequency vs. voltage curves helpful in understanding the operation of the subject invention.

Accordingly, the impedance variation of the semiconductor diode 16 with respect to frequency is suitable for direct connection to an antenna having a conjugate sign and passive impedance vs. frequency characteristic to provide impedance matching between the antenna and EBS. Reference to FIG. 7 discloses a set of voltage vs. frequency characteristic curves for semiconductor diodes having various values of electron concentration $N_d$. A diode made from silicon, for example, has a $N_d$ value of $1 \times 10^{16}$ while a diode formed from gallium arsenide (GaAs) has a diode concentration in the order of $6 \times 10^{17}$. The curves shown by the plots of FIG. 7 clearly illustrate that the frequency for antenna-semiconductor resonance is a function of voltage for various types of semiconductor materials utilized to fabricate semiconductor diodes. Accordingly, by proper application of bias, the non-linear characteristic can be employed as a matching technique for broad-banding an active transmitting antenna employing a biased semiconductive diode bombarded with electrons from an electron gun modulated with the signal to be transmitted.

It should also be noted with respect to FIG. 7 that the bias voltage to be applied to the diode is also a function of the numerical value of the antenna inductance (in μh) as indicated by the ordinate of the curves.

Accordingly, if a purely resistive match condition is not desired or unneeded, then a single bias voltage, set to compensate the antenna inductive reactance near its highest value in the frequency band of interest, can be used. Such an arrangement produces an active antenna requiring no tuning means. The characteristics of such a device are broadband operation at somewhat reduced efficiency compared to the tuned case; or narrower band operation at efficiencies similar to the tuned case. Either possibility, however, is useful in certain applications where simplicity is an important design factor.

Having thus shown and described what are at present considered to be the preferred embodiments of the subject invention, it should be noted that the specification has been set forth by way of illustration and not of limitation and accordingly all modifications, variations and changes coming within the spirit and scope of the invention are herein meant to be included.

We claim as our invention:

1. A low profile, hybrid high power VHF antenna efficiently matched over a 30 MHZ to 1 GHZ band without adjustment, comprising:

a folded monopole antenna having an electrical length which is not more than 0.15 wavelength of its operating frequency having one end thereof electrically connected to a ground plane;

means for feeding and matching said antenna comprising a common vacuum envelope enclosing respectively; an EBS diode having p-layer electrically connected to said antenna and n-layer electrically connected to the said ground plane, the EBS diode being electrically coupled to an external electrical bias means; a source of electrons; and a modulation means positioned between said source and said EBS diode for modulating streams of electrons emanating from said source and striking a surface of said EBS diode, whereby a signal for transmission on the antenna is fed to the said modulation means; and, the said bias means is preadjusted so that the reactive impedance of the EBS diode will equally cancel the reactive impedance of the said antenna at a select midband frequency, for efficient wideband matching with no further adjustment.

2. A low profile, hybrid high power VHF antenna efficiently matched over a 30 MHZ to 1 GHZ band without adjustment, comprising:

a folded monopole antenna having an electrical length which is not more than 0.15 wavelength of its operating frequency and having one end thereof electrically connected to a ground plane;

means for feeding and matching said antenna comprising a common vacuum envelope enclosing respectively; an EBS diode having p-layer electrically connected to said antenna and n-layer electrically connected to the said ground plane, the EBS diode being electrically coupled to an external electrical bias means; a source of electrons; and a modulation means positioned between said source and said EBS diode for modulating streams of electrons emanating from said source and striking a surface of said EBS diode, whereby a signal for transmission on the antenna is fed to the said modulation means; there further being included a variable impedance means coupled between the EBS diode and antenna which is adjusted for resonating transmissions from said antenna at a select midband frequency for efficient wideband matching with no further adjustment.

3. A low profile, hybrid high power VHF antenna efficiently matched over a 30 MHZ to 1 GHZ band without adjustment, comprising:

an antenna comprising a whip type of radiating element including an electrical top loading means connected to the top of said element, the antenna having an effective electrical length which is not more than 0.15 wavelength of its operating frequency, and having one end thereof electrically connected to a ground plane;

means for feeding and matching said antenna comprising a common vacuum envelope enclosing respectively; an EBS diode having p-layer electrically connected to said antenna and n-layer electrically connected to the said ground plane, the EBS diode being electrically coupled to an external electrical bias means; a source of electrons; and a modulation means positioned between said source and said EBS diode for modulating streams of electrons emanating from said source and striking a surface of said EBS diode; whereby a signal for transmission on the antenna is fed to the said modulation means; and, the said bias means is preadjusted so that the reactive impedance of the EBS diode will equally cancel the reactive impedance of the said antenna at a select midband frequency, for efficient wideband matching with no further adjustment.

4. A low profile, hybrid high power VHF antenna efficiently matched over a 30 MHZ to 1 GHZ band without adjustment, comprising:

an antenna comprising a whip type of radiating element including an electrical top loading means connected to the top of said element, the antenna having an effective length no more than 0.15 wavelength of its operating frequency, and having one end thereof electrically connected to a ground plane;

means for feeding and matching said antenna comprising a common vacuum envelope enclosing respectively; an EBS diode having p-layer electrically connected to said antenna and n-layer electrically connected to the said ground plane, the EBS diode being electrically coupled to an external electrical bias means; a source of electrons; and a modulation means positioned between said source and said EBS diode for modulating streams of electrons emanating from said source and striking a surface of said EBS diode, whereby a signal for transmission on the antenna is fed to the said modulation means; there further being included a variable impedance means coupled between the EBS diode and antenna which is adjusted for resonating transmissions from said antenna at a select midband frequency, for efficient wideband matching with no further adjustment.

* * * * *